United States Patent [19]

Lampard

[11] Patent Number: 4,641,616
[45] Date of Patent: Feb. 10, 1987

[54] INTERNAL COMBUSTION ENGINE

[75] Inventor: Robert D. Lampard, Welshpool, Australia

[73] Assignees: Barrack Technology; Baralaba Pty. Limited, both of Australia

[21] Appl. No.: 717,271

[22] PCT Filed: Jun. 29, 1984

[86] PCT No.: PCT/AU84/00121
§ 371 Date: Mar. 1, 1985
§ 102(e) Date: Mar. 1, 1985

[87] PCT Pub. No.: WO85/00410
PCT Pub. Date: Jan. 31, 1985

[30] Foreign Application Priority Data

Jul. 1, 1983 [AU] Australia .................. PG0090/83

[51] Int. Cl.$^4$ ............................................. F02B 19/02
[52] U.S. Cl. ................................. 123/256; 123/274; 123/292
[58] Field of Search ................ 123/256, 292, 274

[56] References Cited

U.S. PATENT DOCUMENTS

| 1,653,825 | 12/1927 | Saives | 123/274 |
| 4,248,192 | 2/1981 | Lampard | 123/256 |
| 4,372,264 | 2/1983 | Trucco | 123/292 X |
| 4,440,124 | 4/1984 | Eckert | 123/256 X |

FOREIGN PATENT DOCUMENTS

| 0996589 | 12/1931 | France . |
| 1276719 | 10/1961 | France . |
| 1322958 | 2/1963 | France . |
| 1331154 | 9/1973 | United Kingdom . |
| 1433508 | 4/1976 | United Kingdom . |

Primary Examiner—Willis R. Wolfe, Jr.
Attorney, Agent, or Firm—Sughrue, Mion, Zinn, Macpeak, and Seas

[57] ABSTRACT

Internal combustion engine having a main combustion chamber (26) and a subsidiary combustion chamber (30) interconnected by a passageway (32) having a flow control element (34) arranged therein to cyclically vary the extent of communication provided between the main and subsidiary combustion chambers. In use a subsidiary air fuel charge is first ignited in the subsidiary combustion chamber (30) with the control element (34) substantially blocking communication between the two combustion chambers (30,26). Then the control element (34) is moved to permit the igniting air fuel charge in the subsidiary combustion chamber (30) to move through the passageway (32) to ignite a main air fuel charge in the main combustion chamber (26). The control element (34) is reciprocable having a head portion (82) which is moved from within the passageway (32), into the subsidiary combustion chamber (30) to effect opening of communication between the combustion chambers (26,30).

6 Claims, 5 Drawing Figures

INTERNAL COMBUSTION ENGINE

This invention relates to an internal combustion engine.

Particularly, the invention is concerned with an internal combustion engine of the kind comprising a main combustion chamber communicating with a subsidiary combustion chamber and flow control means for controlling fluid flow between these, the control means being effective to at least provide a substantial restriction to communication between the combustion chambers, prior to ignition of a subsidiary air fuel charge introduced into the subsidiary combustion chamber in use of the engine, and to subsequently effect relief of said restriction whereby ignited said subsidiary air fuel charge is caused to pass to said main combustion chamber via a passageway extending from the subsidiary combustion chamber to effect ignition of a main working fluid charge in the main combustion chamber, the igniting working fluid charge then expanding against a movable part of the engine to effect operation thereof. Engines as described above, being reciprocating piston engines, are described in my U.S. Pat. No. 4,248,192. In this instance the main combustion chamber communicates with the cylinder space above the piston, such as via an intermediate passage leading to the cylinder, and expansion of the ignited main air fuel charge takes place in the space above the piston.

Engines constructed as above described have been found to be particularly effective in use. Preferred embodiments of such an engine operate on a four stroke cycle, for example with a relatively high compression ratio, such as in the range 12–15:1, for the main air-fuel charge and a relatively low compression ratio such as in the range 6–8:1 for the subsidiary charge. With these engines, separate fuel injection into the two combustion chambers has been found to be effective, with air being admitted to the engine only via an inlet valve to the cylinder volume which communicates with the main combustion chamber, and with the burnt air fuel mixture being exited only via an outlet valve from the cylinder volume so as to avoid air scavenging of the subsidiary combustion chamber.

These engines are capable of operation under a wide range of loads with good efficiency whilst the described "split phase" combustion process has been found to give particularly effective burning of the air fuel charges with minimum generation of undesirable engine emissions, and a tolerance to various differing types of fuel.

The present invention is directed generally towards provision of an improved control means for an engine of the first above described kind.

In accordance with this invention, an internal combustion engine as first above described is characterised in that said control means comprises an element movable in a lengthwise direction of said passageway and arranged to execute lengthwise reciprocatory motion when the engine is operated, said element having a peripheral surface portion thereon which portion is caused to be moved into adjacent relationship with a peripheral surface portion of the passageway, during said reciprocatory movement, whereby to effect said at least substantial restriction of communication between the combustion chamber and is caused to be moved away from said surface portion of the passageway during said reciprocation to present a clearance between the surface portions for effecting said relief of said restriction.

Preferably, the surface portion of the element is cylindrical and the surface portion of the passageway is of complimentary form. Preferably, said element is arranged to move through said passageway, during said reciprocation, whereby to be clear of the surface portion of the passageway at opposite ends of the surface portion of the passageway respectively at respective opposite extremes of the reciprocatory movement, whereby the control means is in an open condition at such extremes and in a substantially closed condition at an intermediate position between said extremes. The element may be driven directly from the engine, such as from the engine cam shaft via a rocker type arrangement. In an alternative construction, the element is driven from the cam shaft or from another shaft in use driven by the engine, such as a dynamic balancing shaft, via suitable drive means for transferring rotary motion of an eccentric to reciprocating motion. Said means may comprise an eccentric element carried by said shaft and slidably movable along a slot or other elongate guide formed in a yoke element which is constrained for reciprocation in the direction of reciprocation of said element, said slot or guide extending transversely to the direction of reciprocation.

The invention is further described by way of example only with reference to the accompanying drawings in which.

Figure 1:
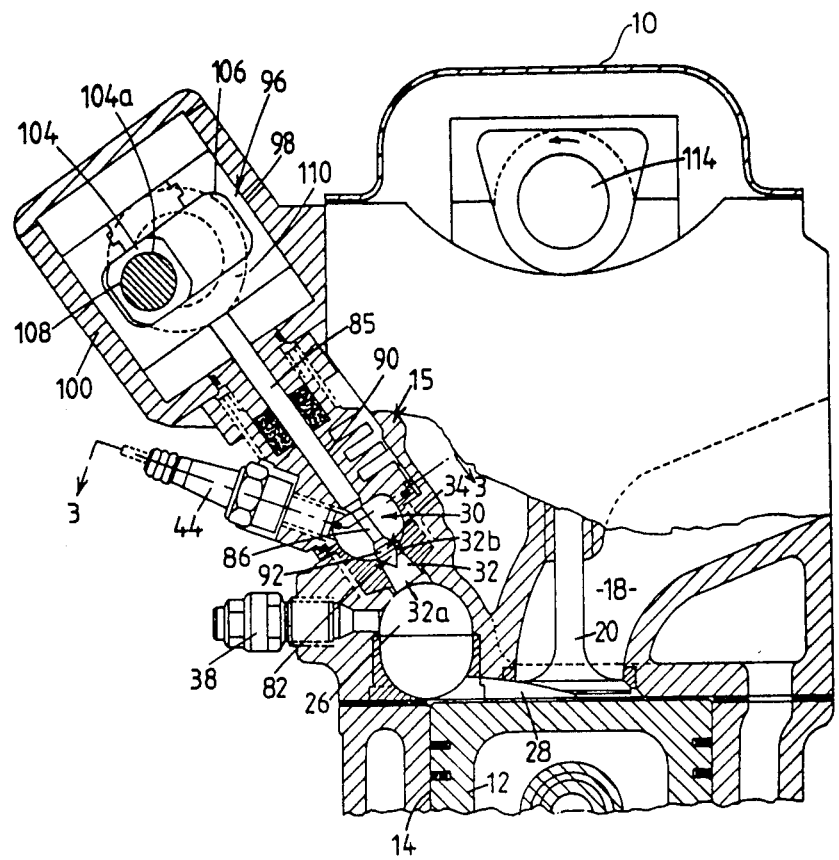
FIG. 1 is a cross section of an engine constructed in accordance with the invention, the section being taken in axial alignment with one cylinder thereof and transverse to the direction of extent of the crank shaft of the engine.

The reciprocatory piston engine 10 shown in the drawings is, aside from details of the cylinder head and ancillary equipment as described hereinafter, of generally conventional construction having a piston 12 which moves in a closed cylinder 14 in the cylinder block 16 of the engine. The piston 12 is substantially flat topped. The cylinder head 15 of the engine has formed therewithin a main combustion chamber 26 which communicates with the top of the cylinder 14 via a short passageway 28. Main combustion chamber 26 is interconnected with a smaller subsidiary combustion chamber 30 also formed in cylinder head 15, via a passageway 32, this passageway having a flow regulating element 34 associated therewith for regulating flow through the passageway and between the combustion chambers 26 and 30.

Figure 3:
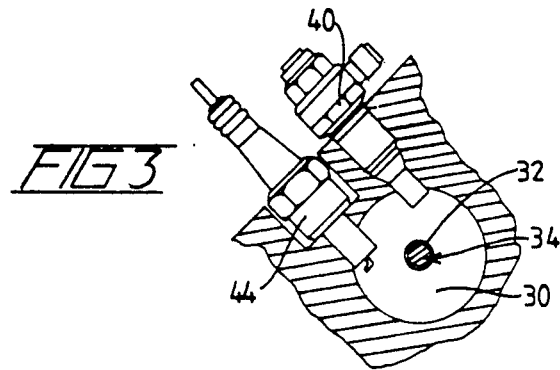
FIG. 3 is a cross section substantially on the line 3—3 in FIG. 1.

Main combustion chamber 26 has a fuel injector 38 associated therewith and arranged for direct injection of fuel thereinto. Subsidiary combustion chamber 30 likewise has a fuel injector 40 (FIG. 3 only) associated therewith and arranged for direct injection of fuel thereinto. Combustion chamber 30 is also provided with a spark plug 44. The cylinder head 15 defines an inlet port 18 having an inlet valve 20 for admission of air to the cylinder 14. An exhaust port and exhaust valve are also provided in the cylinder head, for exhaust of gases from the cylinder 14. These are not shown in the drawings, but are provided in accordance with usual practice for four-stroke engines, being arranged in the cylinder head 15 immediately above the cylinder 14 and to one side of the inlet port 18.

The operation of the engine 10 is generally the same as described in relation to the engine of U.S. Pat. No. 4,248,192 and reference may be made to that specification for description of the principles of the engine. For the present purposes it is, however, sufficient to note that the engine operates on a four-stroke cycle and operation is essentially characterised by the following:

(1) On the induction stroke of the engine with the piston 12 moving away from the top of the cylinder 14, the valve 20 is open to admit air into the volume in the cylinder 14 above piston 12, which air is free to flow through the passageway 28 into the main combustion chamber 26 and, during at least some part of such stroke, along the passageway 32 to the subsidiary combustion chamber 30, element 34 then being in a position not presenting substantial obstruction to flow through the passageway 32.

(2) On the following compression stroke, with inlet valve 20 closed, air in the volume above the piston 12, as well as air in the combustion chambers 26 and 30 is compressed as piston 12 moves towards top dead centre. Initially during the compression stroke, the element 34 is arranged to permit relatively free flow through passageway 32 so that equal compression occurs in the aforementioned cylinder volume above the piston as well as in the two combustion chambers.

(3) At a time prior to the piston 12 reaching top dead centre, the element 34 moves to a position presenting a substantial obstruction to flow through passageway 32, whereupon continued compression of air occurs only in the cylinder volume above the piston and in the main combustion chamber 26. The piston 12 moves with very little clearance above the top of the piston 12 at top dead centre. Thus, essentially the bulk of the air in the volume above the piston is ultimately forced into the two combustion chambers. A consequence of the obstruction of flow through passageway 32 by element 34 occurring prior to completion of compression is, however, that the ultimate compression ratio reached in the combustion chamber 26 is higher than that in subsidiary combustion chamber 30.

(4) At suitable times, fuel in injected into the two combustion chambers 26 and 30 by operation of the fuel injector 38 and the fuel injector associated with subsidiary combustion chamber 30. Injection is arranged so that there is an air-fuel mixture in the chamber 30 before closing obstruction of passageway 32 on the compression stroke, whilst injection from the injector associated with chamber 26 occurs after such closing.

(5) The resultant air-fuel charge in chamber 30 is ignited by operating spark plug 44, usually somewhere before top dead centre, and usually just after commencement of fuel injection into chamber 26 from injector 38, if the engine is operating at high speed.

(6) The element 34 is then moved to a position presenting no substantial obstruction to flow through passageway 32 whereupon the igniting air-fuel charge in chamber 30 is energetically transferred to the chamber 26 via passageway 32 to effect combustion of the air fuel charge in chamber 26.

(7) Burning air-fuel charges from chambers 26 and 30 pass into cylinder 14 to be expanded on the subsequent expansion stroke of the engine as piston 12 moves away from top dead centre.

(8) On the following exhaust stroke, as piston 12 again moves towards top dead centre, the exhaust valve of the engine is opened to exhaust gases from the cylinder 14.

The element 34 is formed from a metal rod, having a head portion 82 separated from a shank portion 85 by a narrowed neck portion 86. Shank portion 85 is received in a bore 90 in head 15 and the element 34 is retained therein for axial sliding movement.

Figure 5:
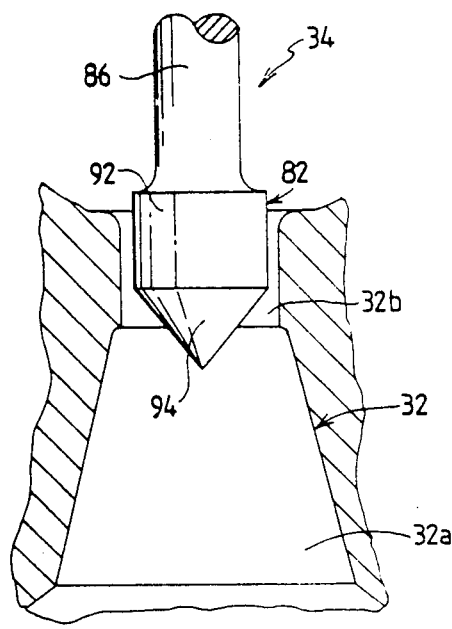
FIG. 5 is an enlarged cross-sectional view of a flow regulating element and associated passageway, incorporated into the engine of FIG. 1.

Passageway 32 is axially aligned with bore 90 and with the axis of element 34. As best shown in FIG. 5, passageway 32 has a first portion 32a of generally frustoconical form communicating with chamber 26 and converging in the direction away therefrom to a narrowed portion at the junction between passageway 32 and chamber 30. This narrowed portion defines a parallel sided cylindrical valve surface 32b. The surface 32b is of slightly lesser diameter than passageway portion where the surface 32b meets portion 32a.

Head portion 82 of element 34 has a cylindrical outer surface portion 92 which is dimensioned so as to be only slightly less than the diameter of the surface 32b, and a conical end surface 94.

The element 34 is arranged, by means described later, for lengthwise reciprocation in use. At one extreme of this movement, the shank portion 85 is retracted into bore 90 so that the head portion 82 is substantially wholly within chamber 30. At the other extreme, the shank portion 85 is advanced out of the bore 90 so that the head portion 82 is adjacent portion 32a of passageway 32 and/or extends into chamber 26. At either of these extremes of movement, the element 34 is in an open condition presenting minimum obstruction to flow through the passageway 32. At the former extreme, there is a fluid flow path around the head portion 82, from chamber 30, through the narrowed portion of passageway 32 defined by surface 32b, thence through passageway portion 32a into chamber 26. At the latter extreme, there is, similarly, a fluid flow path from the chamber 30, around neck portion 86 of element 34 and through the narrowed portion of passageway 32 defined by surface 32b and thence around the head portion 82 and through passageway portion 32a and thence into chamber 26. However at an intermediate location, between these extremes, the surface portion 92 on head portion 82 of element 34 is directly axially aligned with the surface 32b of passageway 32 so that substantial sealing engagement occurs thus obstructing flow through passage 32 and obstructing fluid flow communication between the chambers 26 and 30.

The end of shank portion 85 remote from head portion 82 is connected to a yoke 96 which is constrained for movement in the axial direction of the element 34 by opposed guideways 98, 100 formed on cylinder head 15. A bearing element 104 is slidably retained in a slot 106 in yoke 96, the slot 106 extending in the direction transverse to the direction of axial reciprocation of element 34. Bearing element 104 has a circular bore 104a therethrough and a cylindrical pin 108 is received therein so as to provide a free running clearance between parts. Pin 108 is carried by a countershaft 110 which is mounted for rotation about an axis through which the axis of element 34 passes and which is parallel to the crank shaft (not shown) of the engine. Countershaft 110 carries the pin 108 at an eccentric location. Countershaft 110 is in use driven by means not shown at the same rate as the cam shaft 114 of the engine so as to execute one rotation for each rotation of the crank shaft of the engine, that is to say one rotation for each back and forth reciprocation of piston 12 in cylinder 14. The axis of the pin 108 thus moves on a circular path about the axis of the countershaft 110 thus also moving the yoke 96 in a reciprocatory motion back and forth along the guideways 100, 98. This movement is accompanied by relative rotational movements between bearing element 104 around the pin 108 and by transverse reciprocation of the element 104 along the length of the slot 106. The reciprocation of the yoke 96 which thus occurs causes corresponding reciprocation of the valve element 34.

By the above described arrangement, the valve element 34 is reciprocated in such a fashion as to cause it to move from chamber 26 through passageway 32 and surface 32b thereof into chamber 30 and thence back through the passageway 32 to chamber 26 once on each reciprocation of the piston 12. The movement of the element 34, which so causes head portions 82 to move from chamber 26 to surface 32b of passageway 32, is timed so that the element 34 obstructs flow through passageway 32, pursuant to the surface portion 92 on head portion 82 being adjacent surface 32b of passageway 32, at the desired time of closing of the valve 34 during the compression stroke of the engine. Likewise, the length of the surface portion 92 in the axial direction of the element 34 is arranged to be such that opening of the element 34 occurs, by virtue of the head portion 82 then moving into chamber 30 at the desired time of opening of the passageway 32 after ignition of the subsidiary air fuel charge in chamber 30. The subsequent positioning of element 34 for obstructing flow again, element 34 moves back towards chamber 26, and the two following subsequent obstructions provided by the element 34, which occur on the back and forth reciprocatory movement of the engine piston corresponding to the exhaust and induction strokes of the engine, have no bearing on the operation of the engine.

The described arrangement has been found to be particularly satisfactory in use, since the countershaft 110 causes the reciprocatory movement of the yoke 96 to generate forces which, in operation of the engine, assist in reducing out of balance forces in the engine, so contributing to smoother running.

Figure 2:
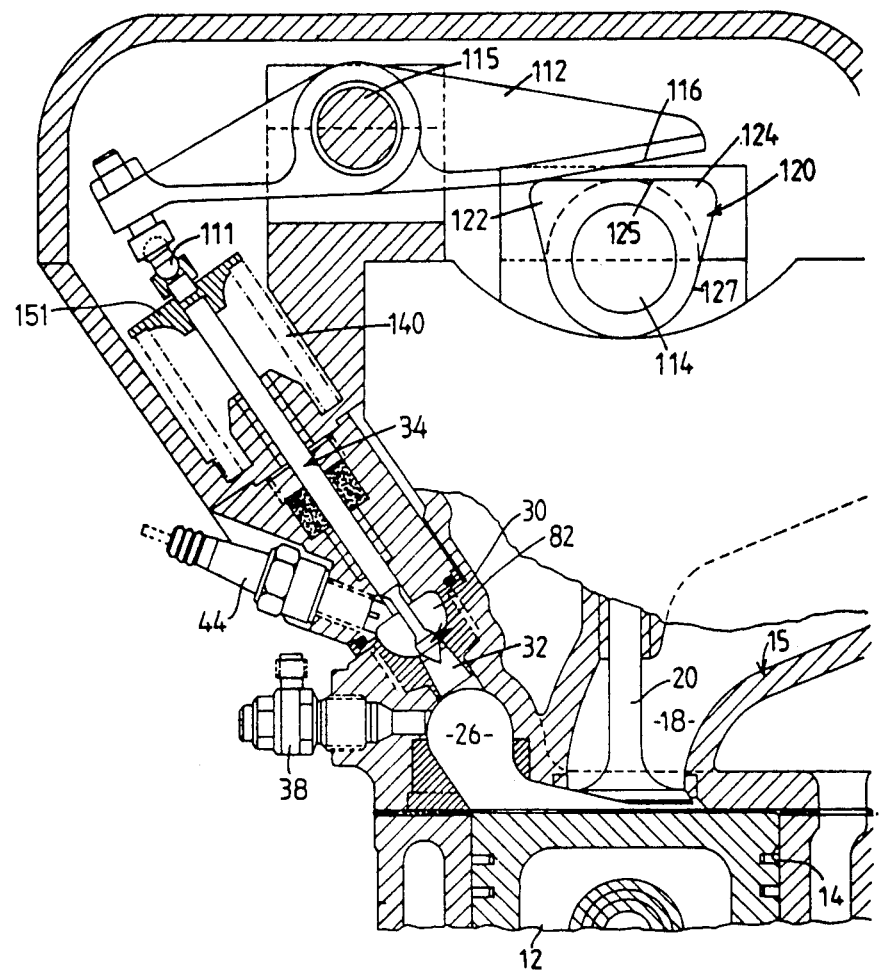
FIG. 2 is a view like FIG. 1 but illustrating a modified engine constructed in accordance with the invention.

FIG. 2 illustrates an alternative method of controlling the element 34. In FIG. 2 like components to those shown in FIG. 1 have like reference numerals and the following description is confined to the differences between the two arrangements. More particularly, instead of providing the counter shaft 110 and yoke 96 the upper end of the element 34 is connected by a suitable universal joint 111 to one end of a lever 112 which is rotatable, in rocking fashion about a shaft 115 arranged with its axis parallel to the axis of the cam shaft 114 of the engine. The end of lever 112 opposite joint 111 has a flat cam surface 116 which is arranged to cooperate with a cam 120 which is in this instance carried by the cam shaft 114 of the engine. Cam 120 has axially displaced lobes 122, 124 of which lobe 122 operates the engine exhaust valve. Lever 112 is however also arranged to engage the cam at the axial location of the lobe 122, whereby the lever 112 is rocked about the axis of shaft 115 once during each rotation of shaft 114. The element 34 is biased to its uppermost position by helical compression spring 140 acting between head 15 and a washer 151 on the outer end of element 34.

The engine is shown in FIG. 2 in a condition where cam lobe 122 is about to leave engagement with surface 116 on lever 112 during rotation of shaft 114. This corresponds to a condition, as shown, where the surface portion 92 of element 34 has just passed through passageway 32 and is leaving a condition of juxtaposition with surface 32b of passageway 32. That is to say, the element 34 is, in this condition, about to be moved from its obstructive position. On rotation of shaft 114 past the position shown, surface 116 on lever 112 comes into engagement with a flat surface 125 on the lobe 122 and, at the location of exact alignment of surfaces 116, 125, the element 34 is lifted to its highest extent so that the head portion 82 is positioned within chamber 30 for full opening of the element 34. The element 34 remains at this position during engagement of a surface 116 on lever 112 with a surface portion 127 of the cam 120 following lobe 122 which surface portion 127 is of constant radius. The element 34 is thus maintained lifted and in an open condition until it is again moved to effect closing by virtue of the surface 116 encountering lobe 122.

In both the arrangements of FIGS. 1 and 2, the element 34 is moved so that the closing motion of the element which is utilized to control operation of the engine during the compression stroke is that which occurs by lifting of the element so that the head portion 82 is moved to its uppermost extreme to be positioned within chamber 30. Whilst it is not essential that this be the movement which is used, since the opposite downward movement could be also used, it has been found preferable to utilize the former movement since this results in the head portion 82 of the element 34 being positioned so as not to offer any obstruction at all to flow through the passageway 32. In the arrangement of FIG. 2, by shaping the cam 120 as shown, it is possible to arrange that the element 34 is maintained, for a substantial part of each rotation of shaft 114 within the chamber 30 so as to minimise interference of flow between the two chambers.

As shown, the neck portion 86 of the element 34 may be made of relatively small diameter to facilitate flow between the chambers 26, 30 when the neck portion is positioned within passageway 32. It is also preferred, as shown, that the head portion 82 should have a conical point at the end thereof remote from stem portion 85 to facilitate flow therearound and into passageway 32 when the head portion 82 is in chamber 30.

The chamber 30 is preferably, as shown, of generally spheriodal configuration, although it could be for example generally cylindrical with its axis generally parallel to the axis of the crank shaft of the engine. In the arrangement shown, the chamber is also symmetrical about the axis of the element 34, such as being defined by a surface of revolution about the axis of element 34.

While the described engine operates on a four-stroke cycle, the invention is equally applicable to engines operating on a two-stroke cycle.

It will be appreciated that the element 34 moves with maximum reciprocatory speed at the mid point of its movement extremities and, by arranging that this mid point of movement coincides with the location of the surface 32b of passageway 32, the element 34 is thus moving at its maximum speed when it is in its position of maximum obstruction of flow, and then moves rapidly to its open condition. This, thus results in extremely rapid and effective opening movement of the element 34 immediately after ignition in the subsidiary combustion chamber. This assists substantially in ensuring rapid outflow of combusting gases from the subsidiary combustion chamber to the main combustion chamber.

It will be appreciated that for effective operation, the head portion 82 of the element 34 needs to move with small clearance through the surface 32b of passageway 32, so that accurate centering of the element 34 relative to the surface 32b is necessary. However it has been found that this may be achieved without difficulty in practice, whilst providing an adequate clearance between the surface 32b and the head portion 82 to render the head portion 82 relatively free from direct contact with the surface 32b, whereby frictional wear is substantially eliminated. On the other hand, the clearance between the surface 32b and the head portion 82 needs to be selected so that adequate obstruction of flow occurs when the two are adjacent. It has been found, however, that it is no means essential that complete obstruction should occur for effective operation. Thus quite substantial clearances may be provided while still permitting adequate operation. It is believed that the reason why incomplete obstruction only still provides adequate operation is because of the relatively limited time for which obstruction is, in any event, necessary for effective operation.

Figure 4:
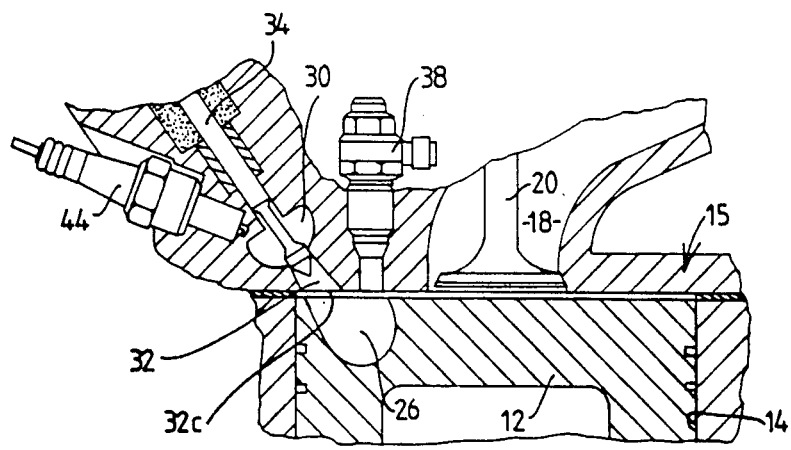
FIG. 4 is a diagrammatic cross sectional view illustrating a modification of the engine of FIG. 1.

Whilst, in the described arrangements, the main combustion chamber 26 is positioned in the cylinder head 15, it would of course be possible to provide the main combustion chamber in the piston 12. Such an arrangement is shown in FIG. 4, diagrammatically, where the main combustion chamber is again designated by reference numeral 26. Here, the subsidiary combustion chamber 30 is of the same form as described in relation to FIGS. 1 and 2 and the construction of the element 34 and its mode of operation identical. In this instance, however, the passageway 32, although being configured to be similar to the configuration shown in FIGS. 1 and 2, communicates at its end opposite chamber 30 with an opening 32c in the cylinder head, which opening 32c provides direct communication to the chamber 26 in the piston 12 when the piston is at locations close to top dead centre, being locations at which, in any event, allow transport of the ignited fuel charge from the subsidiary combustion chamber into the chamber 26. In this instance, the fuel injector 38 is repositioned so as to be positioned in the cylinder head, at a location where it can inject directly into the main combustion chamber 26 when the chamber is close to the top of the cylinder 14 pursuant to the piston 12 being close to top dead centre.

Aside from the above, it is possible to provide for operation where the fuel injectors 40 and 38 are dispensed with, fuel being admitted in admixture with air through inlet 18 using conventional carburation techniques. In this instance the air fuel charges are preformed as they are moved into the main and subsidiary combustion chambers pursuant to opening of inlet valve 20.

In a still further embodiment, the sparkplug 44 is dispensed with, and the compression conditions and fuel mixture conditions in chamber 30 are arranged so that spontaneous combustion arises therein by conventional compression ignition techniques.

The described construction has been advanced merely by way of example and many modifications may be made thereto without departing from the spirit and scope of the invention as defined in the appended claims.

I claim:

1. An internal combustion engine comprising a main combustion chamber communicating with a subsidiary combustion chamber and flow control means for controlling fluid flow between these, the control means being effective to at least provide a substantial restriction to communication between the combustion chambers, prior to ignition of a subsidiary air fuel charge introduced into the subsidiary combustion chamber in use of the engine, and to subsequently effect relief of said restriction whereby ignited said subsidiary air fuel charge is caused to pass to said main combustion chamber via a passageway extending from the subsidiary combustion chamber to effect ignition of a main working fluid charge in the main combustion chamber, the igniting working fluid charge then expanding against a moveable part of the engine to effect operation thereof, wherein said control means comprises a cylindrical element moveable in a lengthwise direction of said passageway and arranged to execute lengthwise reciprocatory motion when the engine is operated, said element having a radially outwardly directed peripheral surface portion thereon which portion is caused to be moved into adjacent relationship with a complementary peripheral surface portion of the passageway, during said reciprocatory movement, whereby to effect said at least substantial restriction of communication between the combustion chambers and is caused to be moved away from said surface portion of the passageway during said reciprocation to present clearance between the surface portions for effecting said relief of said restriction, and further wherein said element is arranged to move through said passageway, during said reciprocation, whereby to be clear of the surface portion of the passageway respectively at respective opposite extremes of the reciprocatory movement, whereby the control means is in an open condition at such extremes and in a substantially closed condition at an intermediate position between said extremes.

2. An internal combustion engine as set forth in claim 1 wherein said element moves into said subsidiary combustion chamber when effecting said relief.

3. An internal combustion engine as set forth in claim 2 wherein said element is driven directly from said engine.

4. An internal combustion engine as set forth in claim 3 wherein said engine is provided with a crankshaft, a cam shaft operatively coupled to said crankshaft and a rocker means interposed between said cam shaft and said element for driving said element.

5. An internal combustion engine as set forth in claim 2 wherein said engine includes a crankshaft, additional shaft means driven by said crankshaft and eccentric drive means operatively interposed between said additional means and said element for transferring rotary motion of said eccentric drive means to reciprocating movement of said element.

6. An internal combustion as set forth in claim 5 wherein said eccentric drive means comprises an eccentric element carried by said additional shaft means, a yoke element constrained for reciprocating movement in the direction of reciprocation of said element and having a guide slot ending transversely to the direction of reciprocation with said eccentric element being slidably disposed in said slot.

* * * * *